United States Patent [19]

Heywood, deceased

[11] Patent Number: 4,572,010

[45] Date of Patent: Feb. 25, 1986

[54] HANDLE RELEASE MECHANISM FOR POKER MACHINES

[75] Inventor: Joseph R. Heywood, deceased, late of Chorleywood, United Kingdom, by Phyllis A. Heywood, executrix

[73] Assignee: 501 Ainsworth Nominees Pty. Limited, Australia

[21] Appl. No.: 750,064

[22] Filed: Jun. 28, 1985

Related U.S. Application Data

[63] Continuation of Ser. No. 487,151, Apr. 21, 1983, abandoned.

[30] Foreign Application Priority Data

Apr. 30, 1982 [AU] Australia .............................. PF3806

[51] Int. Cl.[4] .......................... F16H 5/40; G07F 17/34

[52] U.S. Cl. .......................................... 74/2; 194/217; 194/247; 194/272; 273/143 R

[58] Field of Search ........... 273/134 R; 194/DIG. 11, 194/9 R, 10; 74/2

[56] References Cited

U.S. PATENT DOCUMENTS

| | | | |
|---|---|---|---|
| 1,854,479 | 4/1932 | Mills | 273/143 R |
| 2,006,646 | 7/1935 | Mills | 194/DIG. 11 |
| 2,197,284 | 4/1940 | Wooster | 74/527 |
| 4,000,800 | 1/1977 | Loucks | 194/9 R |
| 4,193,599 | 3/1980 | Heywood | 273/143 R |

FOREIGN PATENT DOCUMENTS

| | | | |
|---|---|---|---|
| 2073447 | 10/1981 | United Kingdom | 273/143 R |
| 2076204 | 11/1981 | United Kingdom | 273/143 R |

*Primary Examiner*—Kenneth J. Dorner
*Assistant Examiner*—Rodney M. Lindsey

[57] ABSTRACT

A handle release mechanism for a poker machine (also known as a slot machine or a fruit machine) in which the pulling of the handle and thus operation of the machine under certain circumstances is prevented by means of a latch; instead of being controlled directly by a solenoid the freeing of the latch is controlled by means of a spring loaded cam, actuation of the solenoid permitting movement of the cam under the action of the spring thereby releasing the latch and allowing the machine to be played. This arrangement necessitates energization of the solenoid only for very short periods.

1 Claim, 5 Drawing Figures

HANDLE RELEASE MECHANISM FOR POKER MACHINES

This application is a continuation of application Ser. No. 487,151, filed Apr. 21, 1983, now abandoned.

BACKGROUND OF THE INVENTION

The present invention relates to a handle release mechanism for a poker machine (also known as a slot machine or a fruit machine) and the object of the invention is to provide a mechanism which overcomes problems associated with conventional handle release mechanisms.

Most poker machines are fitted with a playing handle, upon insertion of a coin or upon having a credit on a meter, a game can be played and the initiation of reel spin for the game is caused by the handle being pulled through an arc and the reels caused to spin near the end of this arc.

When no coin has been inserted, no credit is available on the meter, or the machine is in process of a function which the initiation of a new game would upset, (such as in the middle of paying out), it is necessary that the handle cannot be pulled.

The usual way of freeing the handle is by a solenoid lifting a catch known as the Free Play Lock which then clears a projection on an arm or plate fixed to the handle shaft.

Such an arrangement requires the solenoid to be energised, possibly for long periods, as a player must not lose his coin before pulling the handle. The solenoid therefore could remain energised overnight if the player has left the machine with credit. Under this condition solenoids should not burn out but occasionally do so. Solenoids continually energised sometimes emit an annoying buzz as most are energised by alternating current.

SUMMARY OF THE INVENTION

The present invention overcomes this problem by providing an arrangement in which the solenoid is required to be energised only for a very brief period and instead of operating the Free Play Lock directly, the solenoid operates a latch which allows a spring loaded cam to release the Free Play Lock.

The present invention consists in a handle release mechanism for a poker machine comprising a playing handle arranged for rotation about an axis passing through one end of the handle, a plate attached to and rotatable with the handle, a moveable latch means mounted adjacent the plate arranged to co-operate with means on the plate whereby, when the handle is in an initial position the latch means is in a first position and the handle and the plate are thereby prevented from being rotated, a cam moveable under the influence of spring means arranged adjacent said latch means, a solenoid having a spring loaded armature constructed and arranged to hold said cam in a first position against the force of said spring means, the arrangement being such that on brief energisation of the solenoid the cam is freed to move to a second position under the influence of said spring means and in so moving move the latch means to a second position in which the handle and plate are free to be rotated, means on said plate arranged so that on the plate being rotated through a predetermined angle the cam is moved to its first position against the action of the said spring means allowing the armature to return to its original position holding the cam against movement by said spring means, the latch means rotating to its first position on the handle being returned to its initial position. Suitable electric circuitry is provided to control operation of the solenoid.

BRIEF DESCRIPTION OF THE DRAWINGS

In order that the nature of the invention may be better understood a preferred form thereof is hereinafter described by way of example, with reference to the accompanying drawings in which.

DETAILED DESCRIPTION OF THE EMBODIMENT

Figure 1:
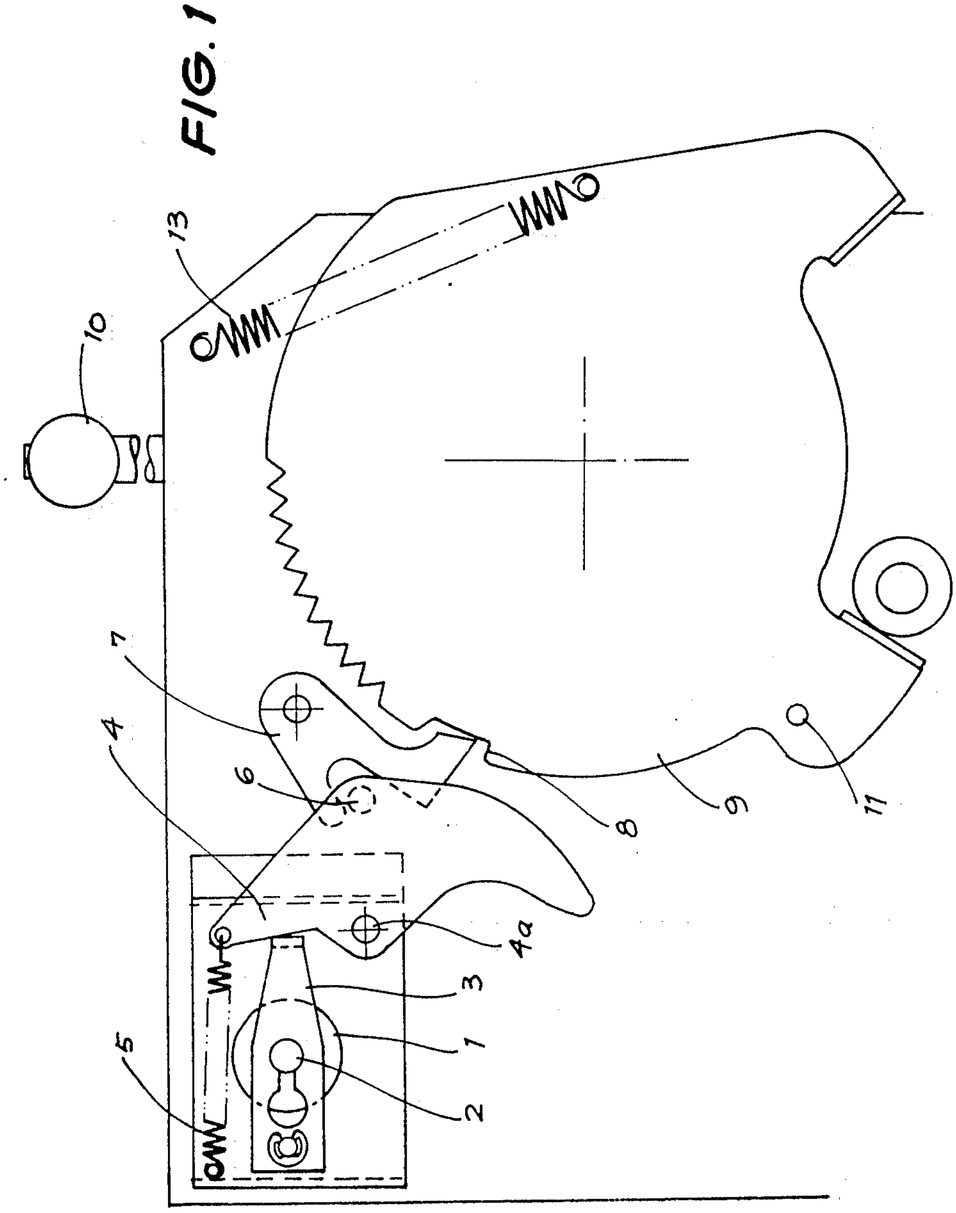
FIG. 1 shows a side elevation from inside the cabinet with the machine at rest.

The handle release mechanism illustrated in the drawings may advantageously be used in conjunction with a handle centre assembly and switches as are described in the complete specification of Patent Application No. 160818.

The mechanism of the present invention operates as follows.

Figure 3:
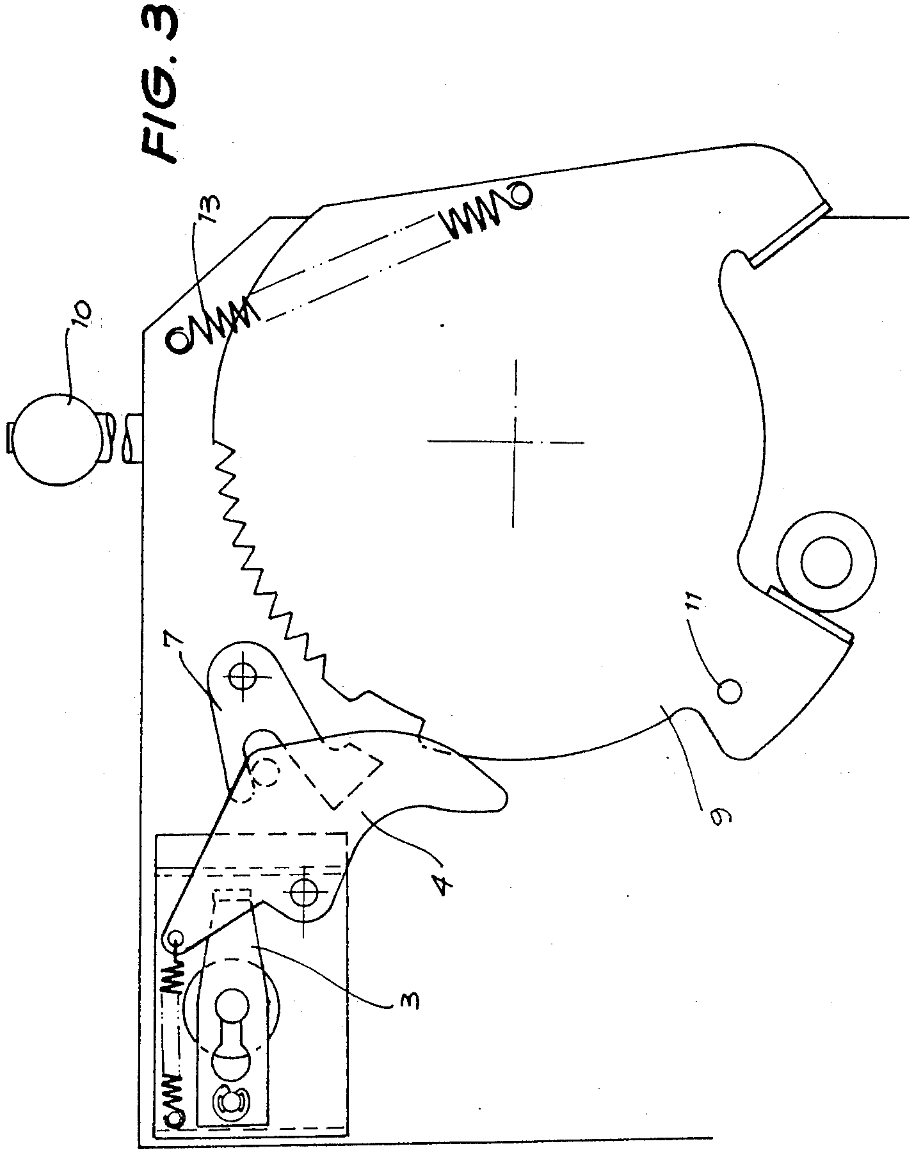
FIG. 3 shows the assembly after the solenoid has been briefly energised and before the handle has been pulled.
Figure 4:
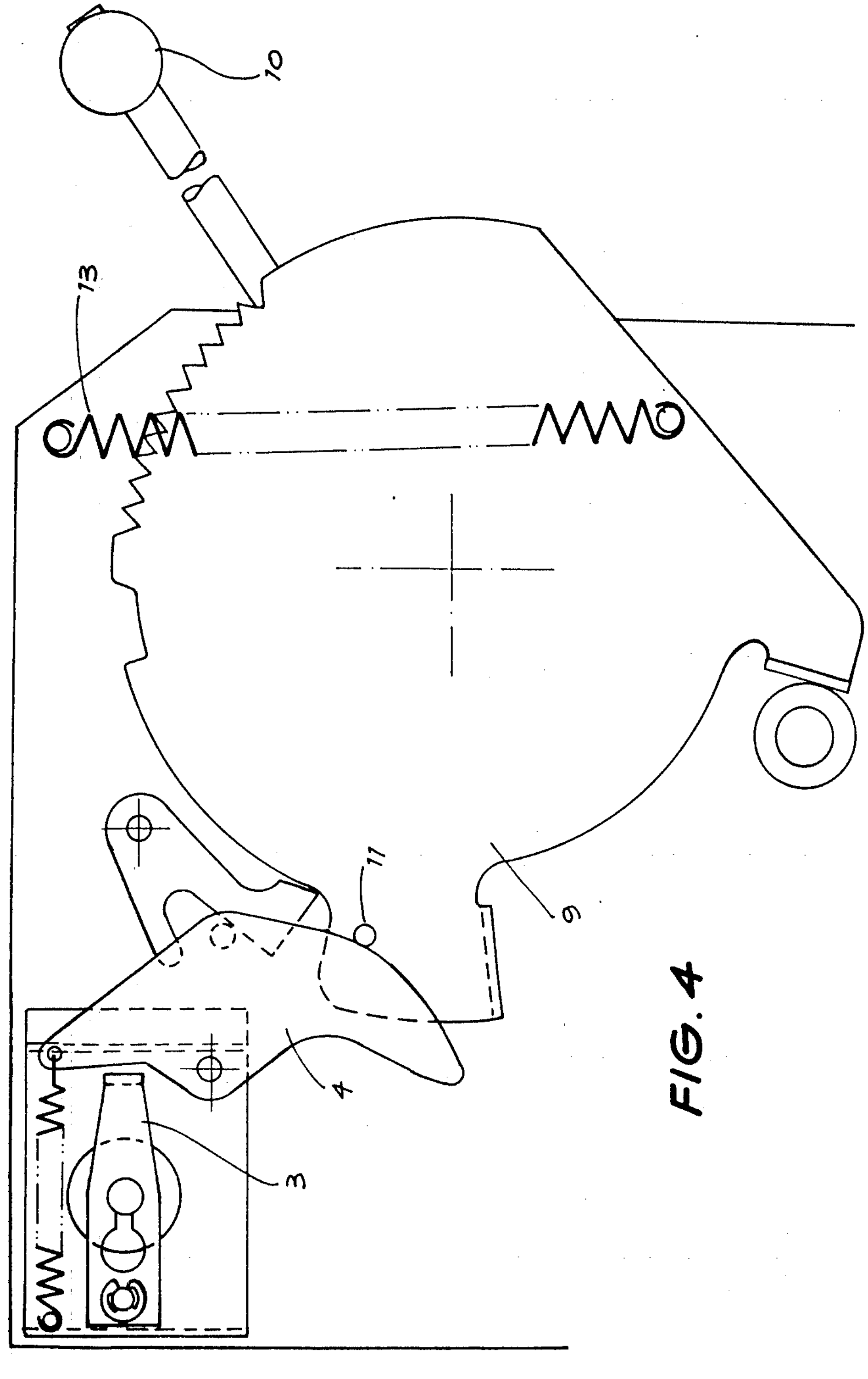
FIG. 4 shows the assembly when the handle has been pulled initiating the game.

Upon the player receiving a credit, solenoid 1 is briefly energised, retracting its plunger 2 and thereby depressing latch 3 as shown in FIG. 3. This then allows cam 4 to revolve anti-clockwise on pivot 4*a* under influence of spring 5. Rotation of cam 4 causes pin 6 which is rivetted to it, to contact the Free Play Lock 7 which is forced to turn clockwise due to the influence of spring 5.

Free Play Lock 7 is now pulled clear of projection 8 of the plate 9 to which the handle 10 is fixed.

Handle plate 9 is turned clockwise (as seen in FIG. 1) by the player pulling the now freed handle 10. Pin 11 fixed to the handle plate contacts the curved exterior of cam 4 causing it to rotate clockwise until it becomes clear of latch 3.

Figure 2:
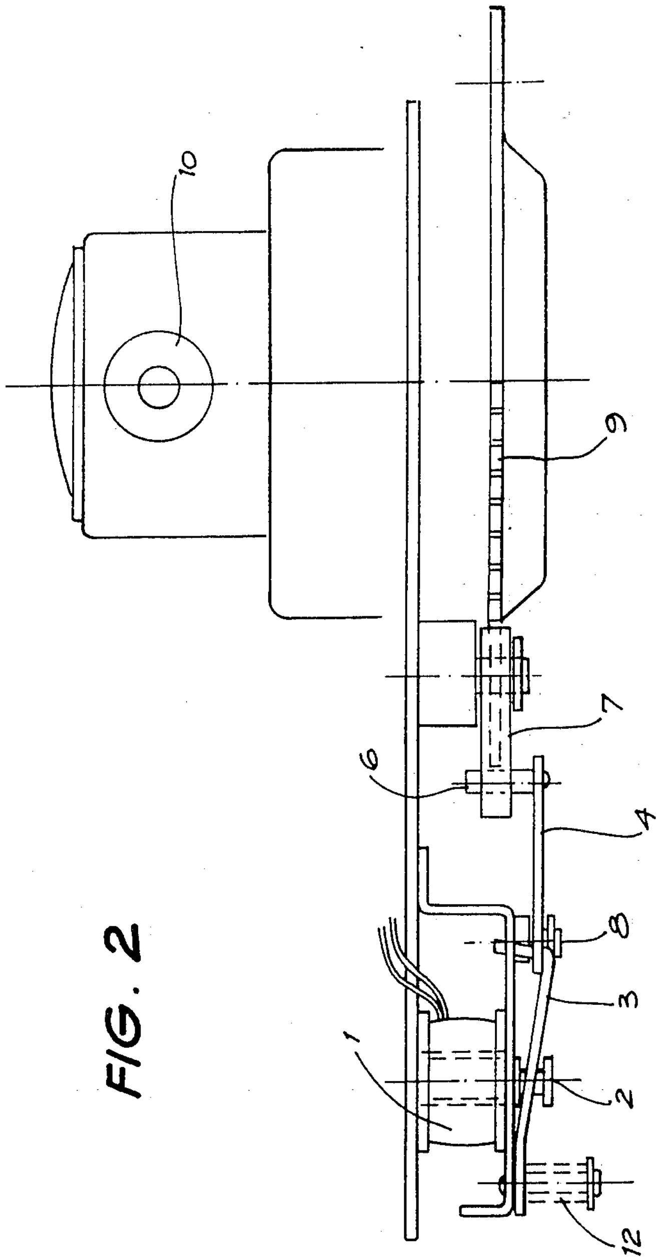
FIG. 2 shows a plan view corresponding to FIG. 1, but with cam spring '5' omitted for clarity.

Latch 3 returns to its originally biased position when clear, due to its compression spring 12 (FIG. 2). Upon the return stroke of the handle by spring 13, pin 11 leaves the side of cam 4 which becomes cocked against latch 3 ready for the next game.

When the handle 10 is returned to its initial position, as shown in FIG. 1, under the action of spring 13, the Free Play Lock 7 returns to its first position under the influence of gravity.

Figure 5:
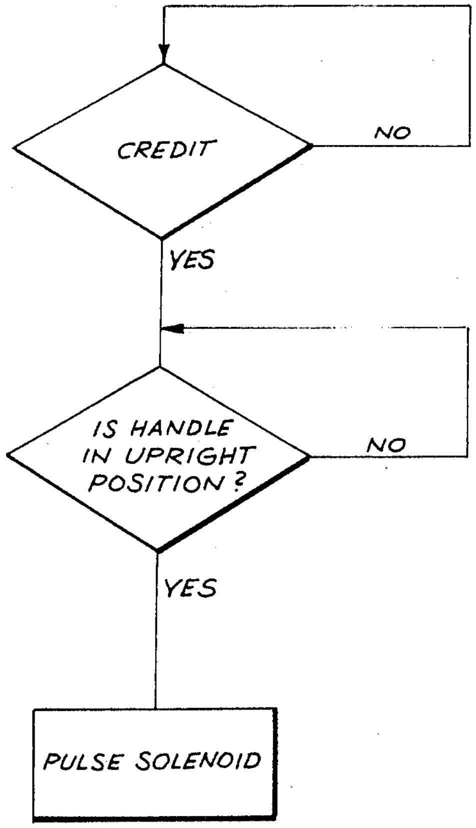
FIG. 5 shows a block diagram of the controlling circuit.

Suitable controlling electric circuitry for the solenoid is provided. This is of a conventional nature and it is therefore not necessary to describe it in detail. A block diagram of the circuitry is shown in FIG. 5. To prevent loss of a coin or credit if a player keeps the handle down, the handle switch (not shown) ensures that any credit is maintained in memory in the electrical circuitry and thus the solenoid is not pulsed until the handle is returned to the upright position.

The embodiment of the invention described in detail above is given by way of example only as constituting a preferred form of the invention within the general scope thereof as defined above.

I claim:

1. A handle release mechanism for a poker machine comprising a playing handle (10) rotatable about an axis passing through one end of the handle, a plate (9) attached to and rotatable with the handle, a movable lock means (7) mounted adjacent the plate and cooperable with means (8) on the plate to prevent rotation of the plate, said lock means being biased into a first position when the handle is in an initial position to prevent the handle and plate from being rotated, a cam (4), spring means (5) acting on said cam, a solenoid (1) having a spring loaded plunger (2), latch means (3) connected to said plunger arranged to hold said cam in a first position against the bias of said spring means when said solenoid is deenergized, said latch means being displaced by said plunger upon a brief energization of the solenoid to free the cam to move to a second position under the bias of said spring means, means (6) on said cam cooperable with said lock means to move said lock means to a second position in which the handle and plate are free to be rotated when said cam is moved to its second position, and means (11) on said plate cooperable with said cam to move the cam to its first position against the bias of the spring means when the plate is rotated through a predetermined angle to allow the plunger under the bias of its spring to return the latch means to its original position holding the cam in its first position, said lock means moving to its first position when the handle is returned to its initial position.

* * * * *